C. L. FERMAN & A. LANE.
BEET HARVESTING MACHINE.
APPLICATION FILED JULY 29, 1911.

1,050,633.

Patented Jan. 14, 1913.

3 SHEETS—SHEET 2.

Witnesses
Chas. W. Stauffiger
Anna C. Pavler

Inventor
Cyral L. Ferman
Albert Lane
By
Attorney

C. L. FERMAN & A. LANE.
BEET HARVESTING MACHINE.
APPLICATION FILED JULY 29, 1911.

1,050,633.

Patented Jan. 14, 1913.
3 SHEETS—SHEET 3.

Witnesses
Chas. W. Stauffiger
Anna E. Ravler

Inventor
Cyral L. Ferman
Albert Lane
By
Attorneys

UNITED STATES PATENT OFFICE.

CYRAL L. FERMAN AND ALBERT LANE, OF MILAN, MICHIGAN.

BEET-HARVESTING MACHINE.

1,050,633.   Specification of Letters Patent.   Patented Jan. 14, 1913.

Application filed July 29, 1911. Serial No. 641,245.

*To all whom it may concern:*

Be it known that we, CYRAL L. FERMAN and ALBERT LANE, citizens of the United States of America, residing at Milan, in the county of Washtenaw and State of Michigan, have invented certain new and useful Improvements in Beet-Harvesting Machines, of which the following is a specification, reference being had therein to the accompanying drawings.

This invention relates to beet harvesters and more particularly to means whereby the machine automatically follows the beet rows and whereby suitable disposition is made of the tops and beets for easy removal from the field.

The invention consists in the matters hereinafter set forth and more particularly pointed in the appended claims.

Figure 1:
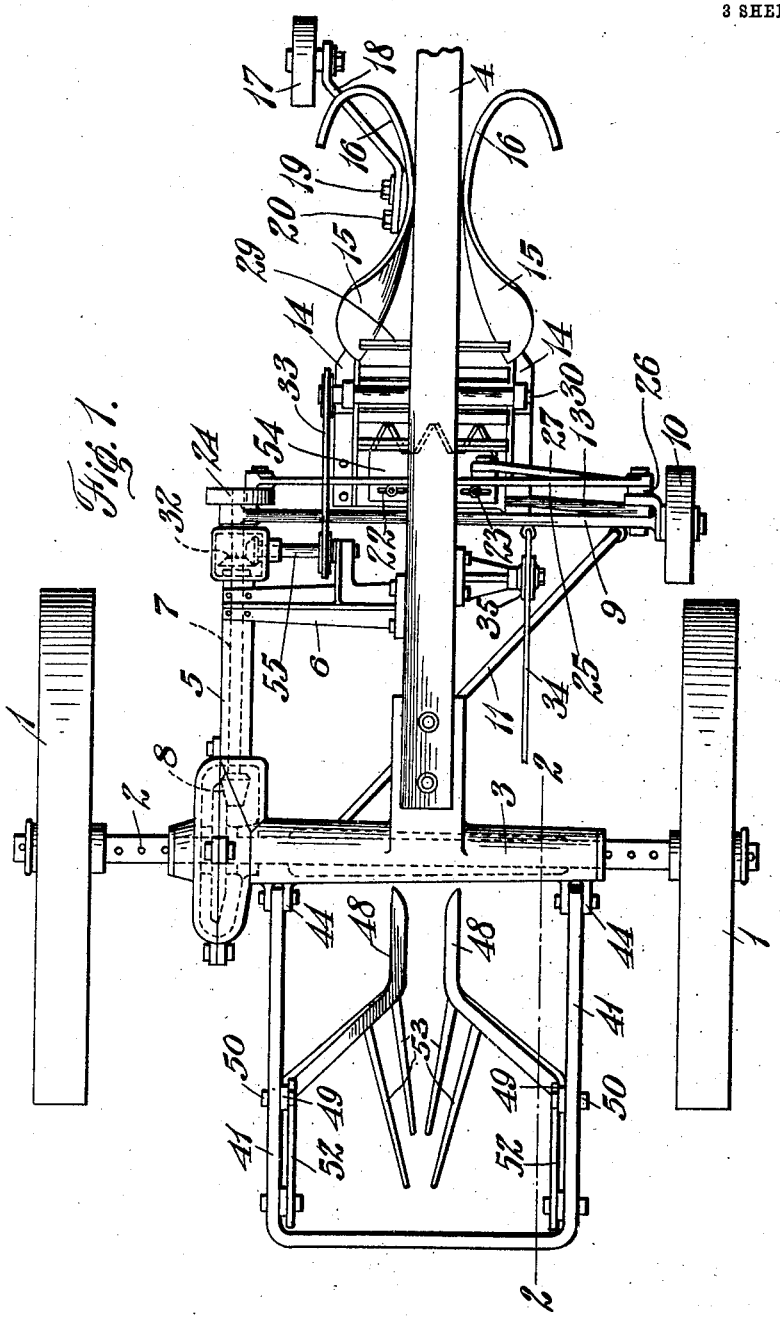
Figure 2:
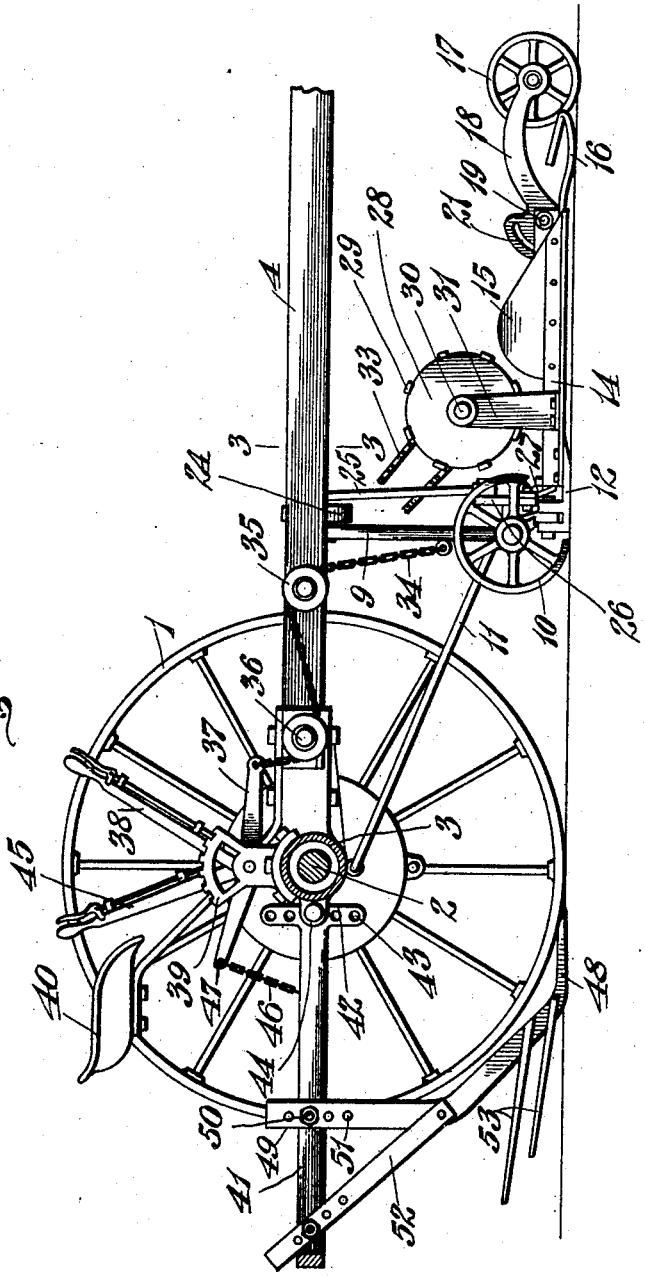
Figure 3:
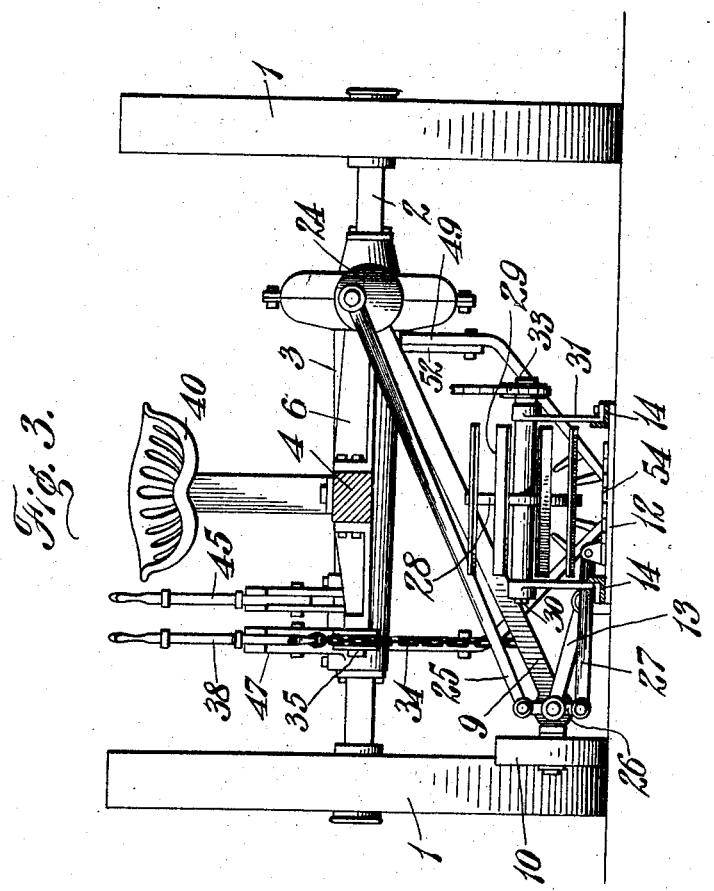

In the drawings, Figure 1 is a plan view, partially broken away with portions removed, to give clear view of a beet harvester that embodies features of the invention; Fig. 2 is a view in longitudinal section taken on or about line 2—2 of Fig. 1; and Fig. 3 is a view in end elevation taken on or about line 3—3 of Fig. 2.

As herein shown in preferred form, a pair of traction bearing wheels 1 are longitudinally adjustable on a main shaft 2 and preferably are connected to drive the same through any preferred ratchet and pawl mechanism common in this type of machines and not shown or claimed herein as part of this invention. A main casing 3 is journaled on and carried by the shaft 2 with a forwardly extending pole 4 for attaching a team or other motive power. A hollow extension or strut 5 of the casing, suitably braced to the pole 4 by a bracket 6 or the like, houses a drive shaft indicated at 7 which is geared by a pair of bevels shown at 8 to the main shaft. A cross brace 9 on the outer end of the strut 5 extends downwardly across the machine and a gage wheel 10 journaled on its outer end travels on the ground in advance of the traction wheels. A brace f. holds the outer end of the member 9 in position.

Beet topping mechanism is connected to and carried by the cross member 9. In preferred form this consists of a shoe 12 riding on the ground with one end connected by a bar 13 that is pivoted at its inner end to the cross member 9. A pair of forwardly extending arms 14 on the shoe carry at their outer end a pair of convergent guides 15 with extending upturned spring arms 16 adapted to under-run and gather beet tops of a row along which the machine is drawn and guide them back toward the shoe 12. The forward ends of the guides 15 are adjustably supported in relation to the ground by a gage wheel 17 journaled on the forward end of a lever arm 18 that is pivoted at its inner end on a stud 19 to one of the members 15, a clamping bolt 20 engaging a segmental slot 21 of the lever arm and securing the latter in angular relation to the arms. The forward edge of the plate 12 is toothed or serrated to co-act with a cutter bar 54 to shear off tops guided through the arms 16 and guides 15 back to the bar. The cutter bar has guide grooves 22 engaged by studs 23 on the shoe 12. A pitman wheel 24 on the end of the shaft 7 reciprocates the cutter bar through the medium of a rod 25, rock arm 26 and link 27, or other suitable means. A disk 28 with beater arms 29 on its periphery is mounted to rotate in front of the cutter bar on a shaft 30 journaled in uprights 31 on the members 14. The beater is driven from the main shaft by suitable connections, as for example, a jack shaft 55 journaled on the extension 5 and bracket 6 and driven by bevel gears 32, sprocket and chain connections indicated at 33 operatively connecting the shaft 30 with the jack shaft.

The topping mechanism may be raised from the ground by suitable means, as, for example, a chain 34 or like flexible connection passing over a pulley 35 on the pole and under a sheave 36, its inner end being connected to a bell crank 37 of a latch lever 38 adjustably interlocking with a quadrant 3b within easy reach of an operator's seat 40. A rearwardly extending frame 41 has a pair of transverse arms 42 provided with a series of holes 43 by which it may be adjustably pivoted between pairs of lugs 44 on the casing 3. It is supported in proper relation to the pole 4 by a latch lever 45 interlocking with the quadrant on the main frame, a chain 46 or like flexible connection sustaining the frame from a bell crank arm 47 of the latch lever. A pair of similar oppositely disposed lifters 48 are secured in substantially parallel relation to travel on the ground in rear of the toppers, with their upper end portions 49 adjustably secured to the frame 41 by bolts 50 or the like engaging in one of a series of holes 51. Adjustably secured braces 52 hold the parts in position. Each lifter is provided with two or more rearwardly extending fingers 53 adapted to raise the lifted beet and shake it clear of dirt before allowing it to drop upon the ground.

In operation the spring fingers of the topping mechanism under-run and lift the tops of a row along which the machine is drawn while the guides behind the spring fingers hold the tops in position so that they are engaged by the beater and forced backward against the shoe and reciprocating knife. The latter severs the tops and leaves the beets clear to be encountered by the lifters which under-run and pull the beets upwardly, the fingers on the lifters allowing the dirt to drop off so that a lifted beet as it falls from the machine lies clean on the top of the ground ready for loading.

By the peculiar connection of the topping mechanism with the machine, the cutter is always gaged to properly sever the tops and crown of the beet regardless of inequalities and irregularities in the surface traversed, the vertical movements of the traction bearing wheels not effecting the position of the cutter. The machine is readily adjusted for use under varying conditions and when once set requires no further attention, the parts not being liable to get out of order, or adjustment while at the same time they act positively upon the beets. The machine is of light draft and requires but little motive power under usual conditions and is equally effective in tilled fields and on irrigated ground where the soil is much harder.

Obviously, changes in the details of construction may be made without departing from the spirit of the invention and we do not care to limit ourselves to any particular form or arrangement of parts.

What we claim is:

1. A beet harvester comprising a pair of traction wheels, a main shaft supported and driven by the traction wheels, a casing in which the main shaft is journaled, beet topping mechanism secured to the casing to travel on the ground including top guiding and beating means, and top severing means, means for positively operating the top severing means, and mechanism mounted in the casing for driving the said operating means from the main shaft.

2. A beet harvester comprising a pair of traction wheels, a main shaft supported and driven by the traction wheels, a casing journaled on the shaft, a transversely disposed member pivoted at one end to the forward portion of the casing, a gage wheel on the ground by which the free end of said member is supported, topping mechanism attached to said member to travel on the ground, means for supporting the forward portion of the topping mechanism at desired elevation from the ground, and mechanism operated by the main shaft and adapted to drive the topping means.

3. A beet harvester comprising a pair of traction bearing wheels, a shaft supported and driven by the wheels, a casing on the shaft, a cross brace pivotally secured at one end to the casing and supported at the other by a gage wheel traveling on the ground, beet topping means secured to the cross brace to travel on the ground, a gage wheel adjustably secured to the forward portion of the topping means for supporting the latter on the ground, and mechanism for driving the topping means from the main shaft.

4. A beet harvester comprising a pair of traction bearing wheels, a shaft supported and driven thereby, a casing journaled on the shaft, a strut extending forward from the casing, a cross brace journaled at its upper and on the strut and supported at its lower end by a gage wheel traveling on the ground, a shoe secured on the cross brace to travel on the ground, top guiding means extending forwardly from the shoe, a gage wheel adjustably secured at the forward portion of the guiding means for supporting them, means on the shoe for severing tops encountered thereby, and mechanism carried by the casing for operating the top severing means from the main shaft.

5. In a beet harvester, a pair of traction bearing wheels, a main shaft supported and driven thereby, a casing journaled on the shaft, a member angularly movable on the casing in a plane substantially parallel to the shaft, means for supporting one end of the member on the ground, beet topping mechanism secured at the rear end to the free end of said member, means traveling on the ground for supporting the forward portion of the beet topping means in adjusted position, and mechanism mounted on the casing and member for operating the topping means from the main shaft.

6. In a beet harvester, a pair of traction bearing wheels, a main shaft supported and driven thereby, a casing journaled on the shaft, a hollow strut extending forwardly from the casing, a cross brace pivotally secured at its upper end to the forward end of the strut, a gage wheel on the ground in which the lower end of the cross brace is journaled, a pole extending forwardly from the casing, means on the casing operatively connected to the cross brace and adapted to raise the latter, a shoe secured to the lower portion of the cross brace to travel on the ground, top guides secured at their rear ends to the shoe, a gage wheel adjustably secured to the forward portions of the guides to support the latter on the ground, a cutter bar reciprocable on the shoe, a shaft journaled in the strut and driven by the main shaft, and means connecting the strut shaft and cutter for driving the latter.

7. In a beet harvester, a pair of traction bearing wheels, a shaft supported and driven thereby, a casing journaled on the shaft, a cross brace pivotally secured at one end to the casing, a gage wheel traveling on the ground and supporting the free end of the cross brace, a shoe secured on the cross brace to travel on the ground and provided with a forward cutting edge, a cutter bar reciprocable on the shoe in operative relation to the cutting edge, a pair of oppositely disposed top guide members extending forwardly from the shoe, a pair of yielding top lifting arms extending forwardly from the guides, adjustable means for supporting the forward portion of the guides on the ground, a shaft in the casing driven by the main shaft, and means operatively connecting said shaft with the cutter bar.

8. In a beet harvester, a pair of traction bearing wheels, a shaft supported and driven thereby, a casing journaled on the shaft, a cross brace pivotally secured at one end to the casing, a gage wheel traveling on the ground and supporting the free end of the cross brace, a shoe secured on the cross brace to travel on the ground and provided with a forward cutting edge, a cutter bar reciprocable on the shoe in operative relation to the cutting edge, a pair of oppositely disposed top guide members extending forwardly from the shoe, a pair of yielding top lifting arms extending forwardly from the guides, a lever arm angularly adjustable on the forward portion of one of the guides, a gage wheel journaled on the outer end of said arm, and means for driving the cutter bar from the main shaft.

9. In a beet harvester, a pair of traction bearing wheels, a shaft supported and driven thereby, a casing journaled on the shaft, a cross brace pivotally secured at one end to the casing, a gage wheel traveling on the ground and supporting the free end of the cross brace, a shoe secured on the cross brace to travel on the ground and provided with a forward cutting edge, a cutter bar reciprocable on the shoe in operative relation to the cutting edge, a pair of oppositely disposed top guide members extending forwardly from the shoe, a pair of yielding top lifting arms extending forwardly from the guides, a lever arm angularly adjustable on the forward portion of one of the guides, a gage wheel journaled on the outer end of said arm, a beater rotatably secured on the guides in advance of the cutter, and means operatively connecting the cutter bar and beater with the main shaft.

10. In a beet harvester, a pair of traction bearing wheels, a shaft supported and driven thereby, a casing journaled on the shaft, a cross brace pivotally secured at one end to the casing, a gage wheel traveling on the ground and supporting the free end of the cross brace, a shoe secured on the cross brace to travel on the ground and provided with a forward cutting edge, a cutter bar reciprocable on the shoe in operative relation to the cutting edge, a pair of oppositely disposed top guide members extending forwardly from the shoe, a pair of yielding top lifting arms extending forwardly from the guides, a lever arm angularly adjustable on the forward portion of one of the guides, a gage wheel journaled on the outer end of said arm, a beater rotatably secured on the guides in advance of the cutter, a shaft journaled in the casing and geared to the main shaft, a pitman wheel on the outer end of said shaft, a pitman rod reciprocated by the wheel, a rock arm on the members oscillated by the pitman rod, and a link articulating the rock arm and cutter bar.

11. In a beet harvester, a pair of traction bearing wheels, a shaft supported and driven thereby, a hollow casing journaled on the shaft, a hollow strut extending forward from the casing, a pole extending forward from the casing, a bracket rigidly connecting the strut and pole, a shaft journaled in the strut, gearing connecting the shaft and main shaft, a cross brace pivoted on the forward end of the strut concentric with the shaft, a gage wheel supporting the free end of the cross brace, a pitman wheel on the outer end of the strut shaft, a rock arm pivoted on the brace near the gage wheel, a pitman rod operated by the pitman wheel and pivoted to one end of the cross arm, a shoe secured to the lower portion of the brace to travel on the ground and provided with a forward serrated cutting edge, a cutter bar having teeth coacting with the cutting edge of the shoe, longitudinally reciprocable on the shoe, a link coupling the other end of the rock arm and bar, a pair of forwardly extending top guides secured at their rear ends to the shoe, a pair of resilient top lifting arms extending forwardly from the guides, a gage wheel supporting the forward ends of the guides, a beater rotatable above the guides and ahead of the cutter, a jack shaft on the casing, and means operatively connecting the beater and jack shaft for rotating the beater.

12. A beet harvester comprising a main shaft, a pair of traction bearing wheels independently adjustable longitudinally on the shaft, adapted to rotate the latter, a casing journaled on the shaft, a pole extending forwardly from the casing, a strut extending forwardly from the casing, a cross brace in a plane substantially parallel to the main shaft pivoted at its upper end to the strut, a gage wheel on the ground supporting the other end of the cross brace, a shoe on the ground articulated at one end to the cross brace to oscillate in relation thereto, top guiding and lifting means extending forwardly from the shoe, a gage wheel adjustably supporting the forward portion of the lifting and guiding means, means on the guides for positively forcing tops therefrom toward the shoe, and cutting means carried on the shoe operated from the main shaft.

In testimony whereof we affix our signatures in presence of two witnesses.

CYRAL L. FERMAN.
ALBERT LANE.

Witnesses:
ANNA C. RAVILER,
ANNA M. SHANNON.

Copies of this patent may be obtained for five cents each, by addressing the "Commissioner of Patents, Washington, D. C."